(12) United States Patent
Kim (10) Patent No.: US 9,065,129 B2
(45) Date of Patent: Jun. 23, 2015

(54) RECHARGEABLE BATTERY INCLUDING FIRST AND SECOND COVERS

(75) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 86 days.

(21) Appl. No.: 13/561,910

(22) Filed: Jul. 30, 2012

(65) Prior Publication Data
US 2013/0095374 A1 Apr. 18, 2013

(30) Foreign Application Priority Data
Oct. 14, 2011 (KR) .................. 10-2011-0105432

(51) Int. Cl.
H01M 2/04 (2006.01)
H01M 2/06 (2006.01)
H01M 2/30 (2006.01)
H01M 2/02 (2006.01)
H01M 2/26 (2006.01)

(52) U.S. Cl.
CPC .............. *H01M 2/30* (2013.01); *H01M 2/0217* (2013.01); *H01M 2/0473* (2013.01); *H01M 2/26* (2013.01); *H01M 2200/103* (2013.01)

(58) Field of Classification Search
CPC ... H01M 2/30; H01M 2/0217; H01M 2/0473; H01M 2/26; H01M 2220/103
USPC ................ 429/179, 178, 163, 182, 57, 62, 65
See application file for complete search history.

(56) References Cited

U.S. PATENT DOCUMENTS

| 7,781,088 | B2 | 8/2010 | Yamauchi et al. | |
|---|---|---|---|---|
| 2010/0227205 | A1 | 9/2010 | Byun et al. | |
| 2010/0233528 | A1 | 9/2010 | Kim et al. | |
| 2011/0117399 | A1* | 5/2011 | Ahn et al. | 429/57 |
| 2011/0244281 | A1* | 10/2011 | Byun | 429/62 |

FOREIGN PATENT DOCUMENTS

| EP | 2 385 566 A1 | 11/2011 |
|---|---|---|
| EP | 2541650 A1 * | 1/2013 |
| EP | 2544265 A1 * | 1/2013 |
| JP | 09-147832 | 6/1997 |
| JP | 2008-66254 A | 3/2008 |

(Continued)

OTHER PUBLICATIONS

European Search Report dated Feb. 18, 2013, for corresponding European Patent Application 12186853.3, 5 pages.*
Korean Office Action dated Dec. 5, 2012 of the corresponding Korean Patent Application No. 10-2011-0105432, noting listed references in this IDS (3 pages).
KIPO Notice of Allowance dated Jan. 8, 2013, for corresponding Korean Patent application 10-2011-0015729, (5 pages).

(Continued)

*Primary Examiner* — Kenneth Douyette
(74) *Attorney, Agent, or Firm* — Christie, Parker & Hale LLP (57) ABSTRACT

A rechargeable battery including an electrode assembly including a first electrode and a second electrode; a case having a space in which the electrode assembly is located; a cap plate coupled with the case; a terminal coupled to the electrode assembly through a current collecting tap, and protruding through the cap plate to an outside of the case; a first cover in which a lower portion of the terminal is located; and a second cover in which an upper portion of the current collecting tap is located, the second cover being coupled with the first cover to secure the terminal and the current collecting tap.

9 Claims, 6 Drawing Sheets

(56) References Cited

FOREIGN PATENT DOCUMENTS

| KR | 10-0965274 B1 | 6/2010 |
|---|---|---|
| KR | 10-2010-0099983 | 9/2010 |
| KR | 10-2010-0102462 | 9/2010 |

OTHER PUBLICATIONS

Korean Patent Abstracts for Korean Publication 1020090037773, dated Apr. 16, 2009, corresponding to Korean Patent 10-0965274 listed above.

English Machine Translation of JP 09-147832, 7 pages, Jun. 6, 1997.

* cited by examiner

RECHARGEABLE BATTERY INCLUDING FIRST AND SECOND COVERS

CROSS-REFERENCE TO RELATED APPLICATION

This application claims priority to and the benefit of Korean Patent Application No. 10-2011-0105432, filed in the Korean Intellectual Property Office on Oct. 14, 2011, the entire contents of which are incorporated herein by reference.

BACKGROUND

1. Field

An aspect of the described technology relates generally to a rechargeable battery, and more particularly, to a terminal connection portion of a rechargeable battery.

2. Description of Related Art

A rechargeable battery is a battery that can be charged and discharged, unlike a primary battery that is not designed to be recharged. A rechargeable battery having a relatively low capacity may be used in a portable electronic device, such as, a mobile phone, a laptop computer, or a camcorder, and a rechargeable battery having a relatively large capacity may be used as, for example, a power supply for driving a motor in an electric vehicle, a hybrid electric vehicle, and the like.

A rechargeable battery that uses a non-aqueous electrolyte (electrolytic solution) having a relatively high energy density may be configured in a large capacity battery module, in which a plurality of rechargeable batteries are coupled in series in order to be used to drive devices requiring a relatively large level of power, for example, electric vehicle motors.

Further, one battery module may include a plurality of rechargeable batteries that are coupled in series. The rechargeable battery may be formed in cylindrical or angular shapes.

A terminal of a rechargeable battery may have a relatively complicated lower structure that is coupled to an electrode assembly; a relatively complicated work process may accompany the installation of the terminal. In addition, if the electrolytic solution infiltrates into gaps of lower structures of the terminal, an external short-circuit may occur by coupling the terminal and the cap plate.

The above information disclosed in this Background section is only for enhancement of understanding of the background of the described technology and therefore it may contain information that does not form the prior art that is already known in this country to a person of ordinary skill in the art.

SUMMARY

An aspect of the described technology is direct to the assembly and/or safety of a rechargeable battery.

An exemplary embodiment of the present invention provides a rechargeable battery including an electrode assembly including a first electrode and a second electrode; a case housing the electrode assembly; a cap plate coupled with the case; a terminal electrically coupled to the electrode assembly through a current collecting tap, and protruding through the cap plate to an outside of the case; a first cover in which a lower portion of the terminal is located; and a second cover in which an upper portion of the current collecting tap is located, the second cover being coupled with the first cover to secure the terminal and the current collecting tap.

The first cover may be coupled with the second cover by being inserted thereinto.

The rechargeable battery may further include a gasket, and the terminal may include a terminal flange and a terminal pillar protruding from the terminal flange to the outside of the case. The gasket may include a lower insulating portion in which the terminal flange is located and an upper insulating portion that surrounds the terminal pillar and protrudes upwardly.

The first cover may have a hole, and a portion of the gasket may be located in the first cover. The upper insulating portion of the gasket may protrude through the hole. The terminal may further include a terminal protrusion protruding from the terminal flange along a periphery of the terminal pillar. The gasket may further include a groove in which the terminal protrusion is disposed, and a step portion on an opposite side of the groove. The step portion may protrude through the hole of the first cover and may contact a lower surface of the cap plate.

The current collecting tap may include a fuse portion having a smaller cross-section than its surroundings. At least one of the first cover or the second cover may include a fuse protrusion protruding into the fuse portion.

The second cover may include protection protrusions protruding to an outside of the current collecting tap, the current collecting tap being located between the protection protrusions.

The second cover may surround the upper portion of the current collecting tap and sidewalls of the first cover.

The first cover may surround sidewalls of the second cover.

A sealant may be between the first cover and the second cover.

The first cover may include a protrusion inserted into a groove on the cap plate.

According to an aspect of embodiments of the present invention, assembly and safety of a rechargeable battery may be improved by integrating a terminal and a current collector.

DETAILED DESCRIPTION

Hereinafter, aspects of the present invention will be described more fully with reference to the accompanying drawings, in which exemplary embodiments of the invention are shown. As those skilled in the art would realize, the described embodiments may be modified in various different ways, all without departing from the spirit or scope of the present invention. In the drawings and description, like reference numerals designate like elements throughout the specification. Throughout the specification, when a first element is referred to as being "on" or "coupled to" a second element, the first element may be directly "on" or "coupled to" the second element, or indirectly "on" or "coupled to" the second element via one or more intervening elements.

Figure 1:
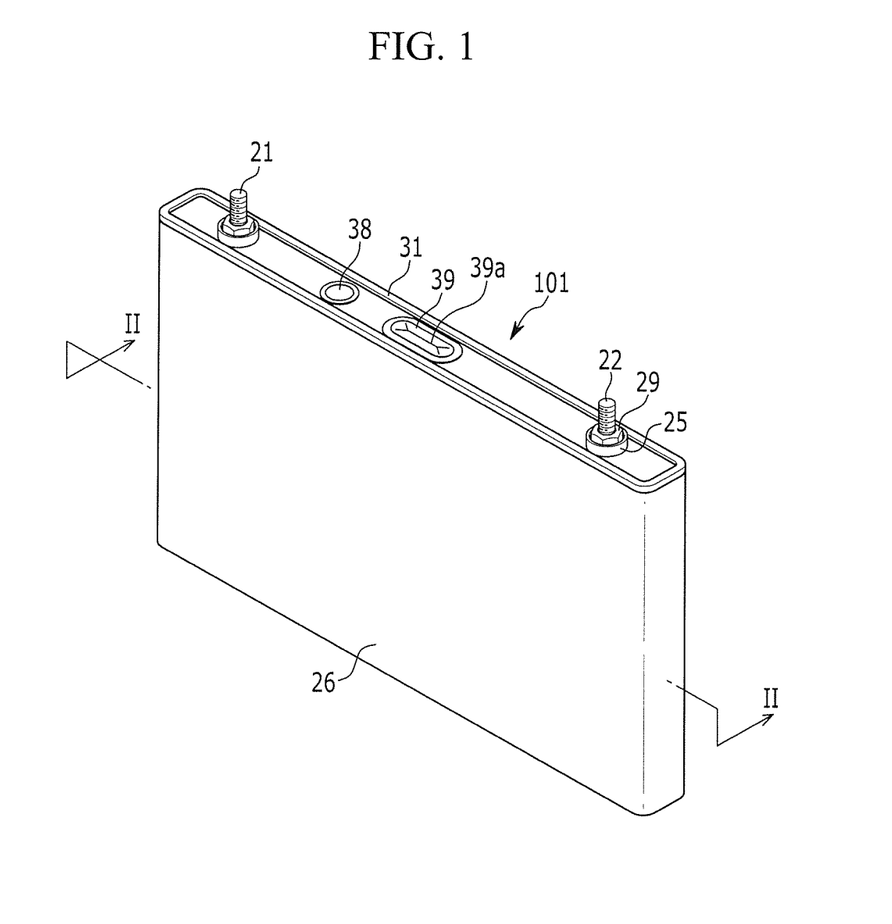
FIG. 1 is a perspective view that illustrates a rechargeable battery according to a first exemplary embodiment of the present invention.
Figure 2:
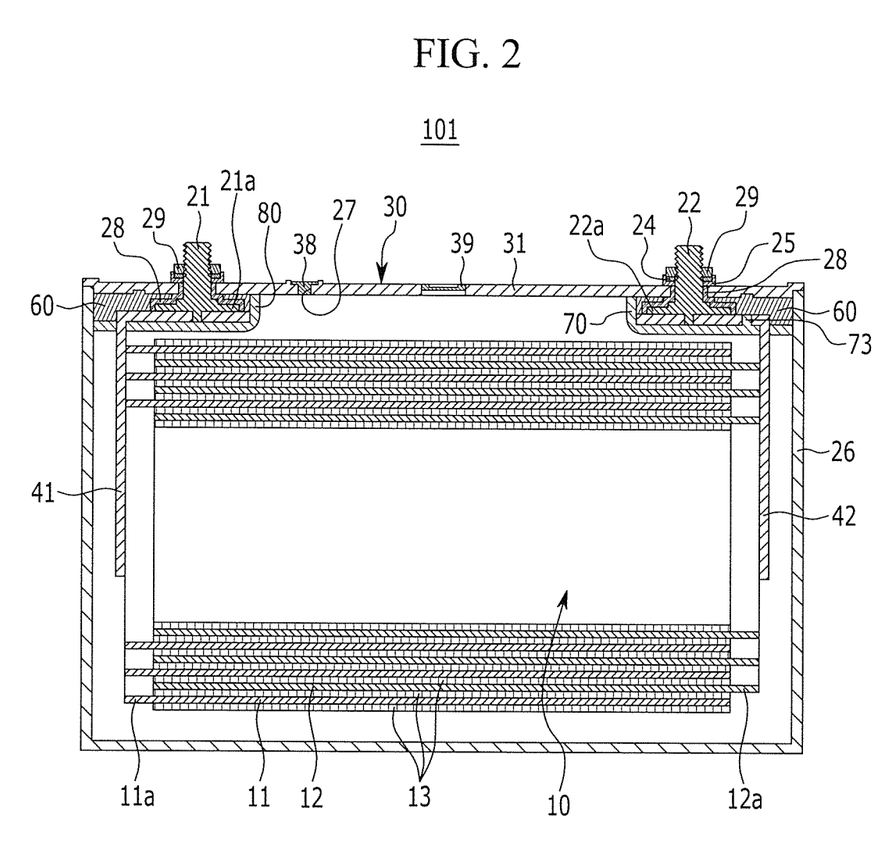
FIG. 2 is a cross-sectional view that is taken along the line II-II of FIG. 1.

FIG. 1 is a perspective view that illustrates a rechargeable battery according to a first exemplary embodiment of the present invention, and FIG. 2 is a cross-sectional view that is taken along the line II-II of FIG. 1.

Referring to FIGS. 1 and 2, the rechargeable battery 101 according to the first exemplary embodiment of the present invention includes an electrode assembly 10 that is wound with a separator 13 interposed between a positive electrode (first electrode) 11 and a negative electrode (second electrode) 12, a case 26 housing (e.g., enclosing) the electrode assembly 10, and a cap assembly 30 that is coupled (e.g., combined) with an opening of the case 26.

The rechargeable battery 101 according to the first exemplary embodiment of the present invention will be described with reference to an example of an angular shaped (e.g., rectangular-shaped or hexahedral-shaped), lithium ion rechargeable battery. However, the present invention is not limited thereto, and may be applied to various types and/or shapes of batteries, such as, a lithium polymer battery or a cylindrical battery.

The positive electrode 11 and the negative electrode 12 each may include a coated region, on which an active material is coated on a current collector that is formed, for example, by a metal foil of a thin plate, and an uncoated region, on which the active material is not coated.

In one embodiment of the present invention, the positive electrode uncoated region 11a is formed at one side at one end of the positive electrode 11 along a length direction of the positive electrode 11, and the negative electrode uncoated region 12a is formed at another side at one end of the negative electrode 12 along a length direction of the negative electrode 12.

Further, the positive electrode 11 and negative electrode 12 may be arranged, e.g., wound, with a separator 13 that is an insulator interposed therebetween. However, aspects of the present invention are not limited thereto, and the electrode assembly 10 may have a structure in which the positive electrode and the negative electrode include a plurality of sheets (or plates) laminated with an insulator interposed therebetween.

The case 26 may have a substantially cuboid shape, and an opening may be formed at one side thereof. The cap assembly 30 includes a cap plate 31 that covers the opening of the case 26, a positive electrode terminal 21 that protrudes outside the cap plate 31 and is electrically coupled to the positive electrode 11, a negative electrode terminal 22 that protrudes outside the cap plate 31 and is electrically coupled to the negative electrode 12, and a vent 39 in which a notch 39a is formed so that the vent may be broken according to a suitable internal pressure, e.g., a predetermined internal pressure.

In one embodiment of the present invention, the cap plate 31 is formed of, for example, a thin metal plate, and includes an electrolyte injection opening 27 for injecting an electrolytic solution at one side, and a sealing stopper 38 that seals the electrolyte injection opening 27 secured (e.g., fixed) to the cap plate 31.

The positive electrode terminal 21 and the negative electrode terminal 22 each may be disposed (e.g., installed) with a portion thereof penetrating through the cap plate 31, with a first gasket 25 at an upper portion thereof, and with a second gasket 28 at a lower portion thereof. A corresponding one of the first gaskets 25 and a corresponding one of the second gasket 28 are further located between the cap plate 31 and a corresponding one of the positive electrode terminal 21 or the negative electrode terminal 22 to insulate the cap plate from the positive electrode terminal 21 and/or the negative electrode terminal 22.

In one embodiment of the present invention, the terminals 21 and 22 have a substantially cylindrical shape (e.g. a circular cylinder shape), on which fasteners (e.g., nuts 29) that support the terminals 21 and 22 at an upper portion thereof are located (e.g., installed) on the terminals 21 and 22. Threading, similar to that of a screw, may be formed on an outer circumference of the terminals 21 and 22, with which a corresponding one of the nuts 29 may be coupled. A current collecting tap 41 that is electrically coupled to the positive electrode 11 may be at (e.g., installed on) the positive electrode terminal 21, and a current collecting tap 42 that is electrically coupled to the negative electrode 12 may be at (e.g., installed on) the negative electrode terminal 22.

Additionally, at a lower portion of the terminals 21 and 22, terminal flanges 21a and 22a that support the terminals at the lower portion may be formed. If nuts 29 are fastened onto the terminals 21 and 22, spaces between the cap plate 31 and the terminals 21 and 22, respectively, are sealed by compressing the first gaskets 25 and the second gaskets 28 with the terminal flanges 21a and 22a and the nuts 29.

In one embodiment of the present invention, a first cover 60 for insulation is located (e.g., installed) between the terminal flange 21a and the cap plate 31, and another first cover 60 for insulation is located (e.g., installed) between the terminal flange 22a and the cap plate 31. The first cover 60 that is at the positive electrode terminal 21 may couple (e.g., combine) with a second cover 80 by being inserted thereinto, and the first cover 60 that is at the negative electrode terminal 22 may couple (e.g., combine) with the second cover 70 by being inserted thereinto.

Figure 3:
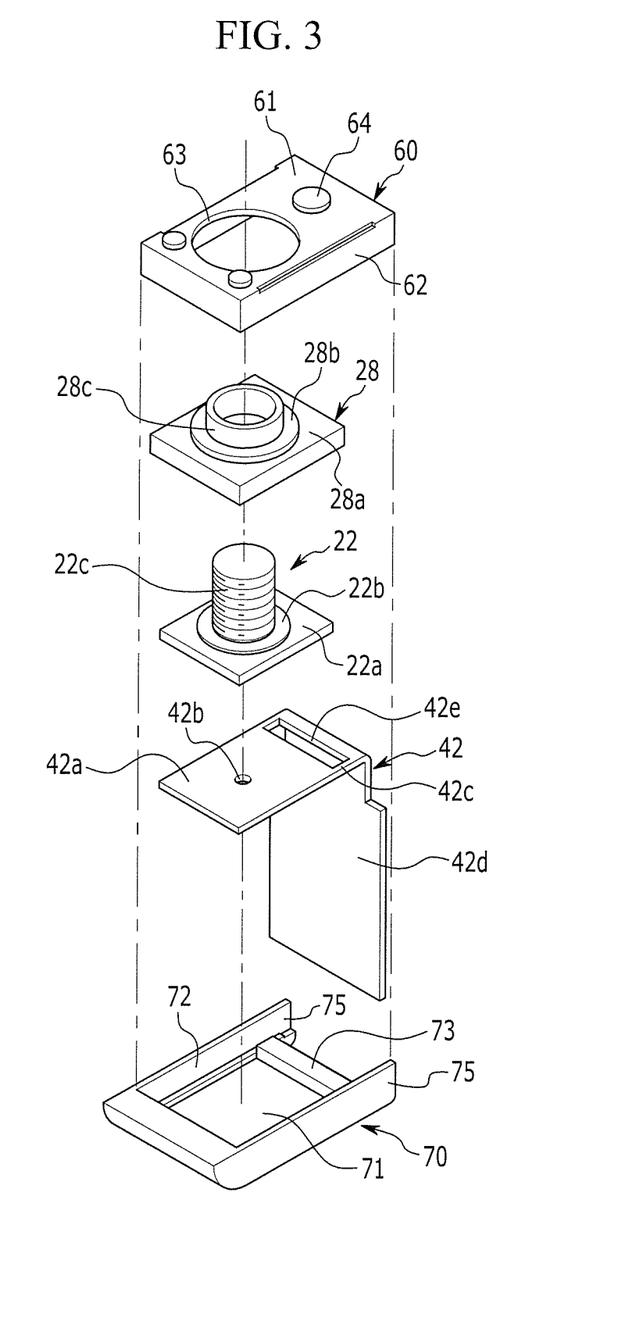
FIG. 3 is an exploded perspective view in which a negative electrode terminal and a current collecting tap according to the first exemplary embodiment of the present invention are observed from above.
Figure 4:
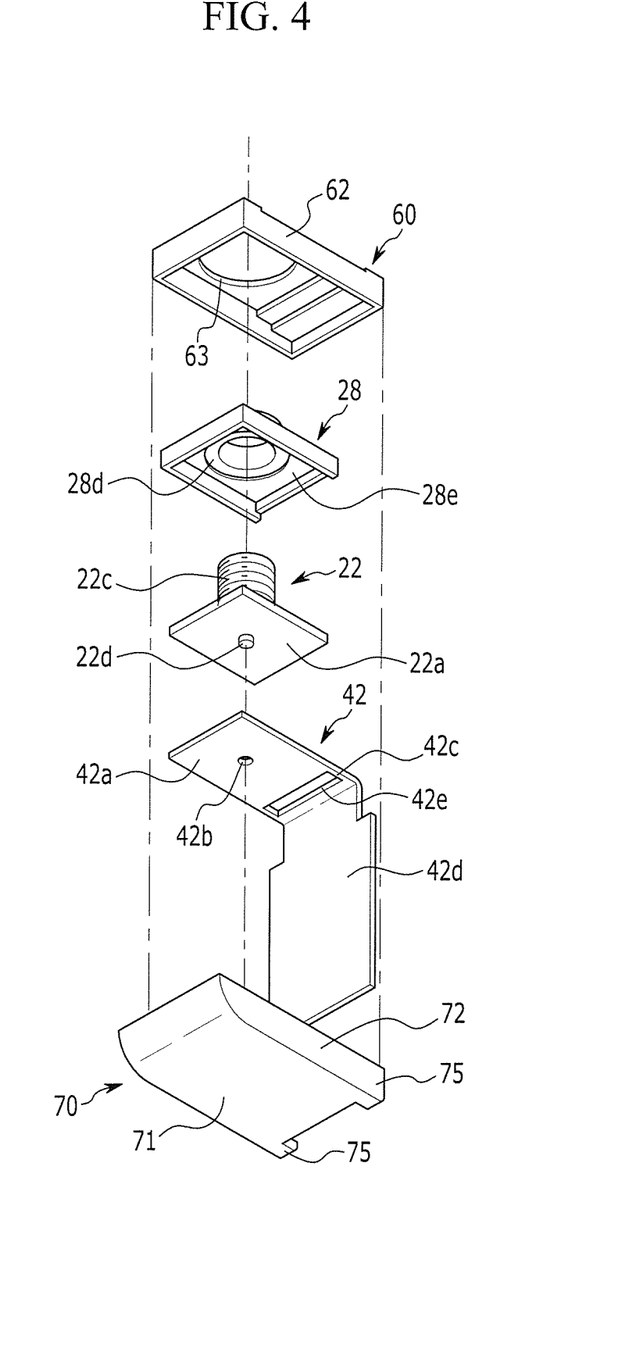
FIG. 4 is an exploded perspective view in which a terminal module according to the first exemplary embodiment of the present invention is observed from below.

FIG. 3 is an exploded perspective view in which a negative electrode terminal and a current collecting tap according to the first exemplary embodiment of the present invention are observed from above. FIG. 4 is an exploded perspective view in which a terminal module according to the first exemplary embodiment of the present invention is observed from below.

With reference to FIGS. 3 and 4, since the positive electrode terminal 21 and the negative electrode terminal 22 have the same (or substantially the same) structure, a detailed description with respect to the positive electrode terminal 21 is given by way of reference to the negative terminal 22 and is omitted herein.

The negative electrode terminal 22 may include the terminal flange 22a and a terminal pillar 22c protruding toward the upper portion of the case 26 on the terminal flange 22a. The terminal flange 22a supports the terminal pillar 22c under the cap plate 31 by protruding in a lateral direction of the terminal pillar 22c. On the terminal flange 22a, a terminal protrusion (e.g., a protrusion spot) 22b protruding along a periphery (e.g., a circumference) of a lower end of the terminal pillar 22c is formed.

In one embodiment of the present invention, the current collecting tap 42 that is electrically coupled to the negative electrode uncoated region 12a is coupled (e.g., fixed) to the negative electrode terminal 22, for example, by welding. The current collecting tap 42 may include an upper connection portion 42a coupled (e.g., welded) to the terminal flange 22a, and a lower connection portion 42d that is bent at the upper connection portion 41a so that it continues downwardly, and is coupled (e.g., fixed) to the negative uncoated region 12a. A fixing hole 42b (e.g., a welding hole) configured to receive a support protrusion 22d formed on the lower portion of the terminal flange 22a is located at the upper connection portion

42a. In a state in which the support protrusion 22d is inserted into the fixing hole 42b, the support protrusion 22d is secured (e.g., fixed) to the upper connection portion 42a, for example, by welding.

Additionally, a fuse portion 42c having a smaller cross-section than its surroundings may be formed on the upper connection portion 42a. A fuse hole 42e may be formed at the center of the fuse portion 42c, the fuse portion 42c having a smaller cross-section than its surroundings. However, the present invention is not limited thereto, and, alternatively, a groove may be formed at the fuse portion 42c. The current collecting tap 41 coupled to the positive electrode terminal 21 may have the same, or substantially the same, structure as the current collecting tap 42 coupled to the negative electrode terminal 22, except as to whether or not the fuse portion is formed. In one embodiment of the present invention, the fuse portion 42c is on the current collecting tap 42 coupled to the negative electrode terminal 22, but the present invention is not limited thereto, and the fuse portion may be on the current collecting tap 41 coupled to the positive electrode terminal 21.

If the fuse portion 42c is on the current collecting tap 42, when an overcurrent flows, the fuse portion 42c melts, which opens a current path. If the fuse portion 42c is on the current collecting tap 42, when a relatively large current flows because of an occurrence of a short-circuit, the fuse is operated, such that safety may be improved.

In one embodiment of the present invention, the second gasket 28 includes a lower insulating portion 28a configured to receive the terminal flange 22a and an upper insulating portion 28c that covers the terminal pillar 22c and protrudes upwardly. The second gasket 28 may be formed of, for example, a synthetic resin, e.g., a synthetic resin having elasticity.

The lower insulating portion 28a may be formed to cover the upper surface and lateral surface of the terminal flange 22a, and the terminal flange 22a may be inserted thereinto. A groove 28d into which the terminal protrusion 22b may be inserted is formed on the lower insulating portion 28a, and because of the formation of the groove 28d, a step portion 28b protruding along the periphery (e.g., the circumference) of the upper insulating portion 28c is formed on the second gasket 28.

In one embodiment of the present invention, the step portion 28b penetrates through the hole 63 on the first cover 60, and contacts the lower surface of the cap plate 31. The step portion 28b may make contact with the cap plate 31 by being pressed by the terminal protrusion 22b. As described above, since the step portion 28b of the second gasket 28 having elasticity is contacted (e.g., closely contacted) with the cap plate 31, a space between the cap plate 31 and negative electrode terminal 22 may be sealed (or substantially sealed). Additionally, an upper insulating portion 28c may have a cylindrical shape, and may be inserted into the terminal hole on the cap plate 31, and the terminal pillar 22c may be inserted thereinto.

In one embodiment of the present invention, the first cover 60 is installed on the upper portion of the second gasket 28, in which the first cover 60 is disposed between the cap plate 31 and the second gasket 28. The hole 63 into which the second gasket 28 is inserted is formed on the first cover 60, and the step portion 28b and the upper insulating portion 28c are inserted into the hole 63.

The first cover 60 may be around (e.g., surround or cover) the upper surface and lateral surface of the second gasket 28. A support protrusion 64 inserted into a groove formed on the cap plate 31 may be formed on the top surface of the first cover 60. Since the support protrusion 64 may be installed by being inserted into the groove, the first cover 60 may be installed at a relatively accurate position with respect to the cap plate 31, and by installing the nut 29 on the negative electrode terminal 22, it is possible to prevent rotation of the first cover 60.

The first cover 60 may couple with the second cover 70 by being inserted thereinto, and the second cover 70 may be installed so that the second cover and the upper connection portion 42a of the current collecting tap 42 covers the first cover 60. A cover plate 61 that may have, for example, a rectangular shape and a side wall 62 that protrudes downwardly at a side end of the cover plate 61 may be formed on the first cover 60.

The second cover 70 may include a cover plate 71 that has, for example, a rectangular shape, and a side wall 72 that protrudes upwardly at a side end of the cover plate 71. In one embodiment of the present invention, the side wall 72 protrudes at three side ends of the cover plate 71 and opens in a direction such that the lower connection portion 42d formed on the current collecting tap 42 may continue downwardly. Protection protrusions 75 that protrude to an outside of the current collecting tap 42 may be formed at both side ends of the second cover 70, and the lower connection portion 42d may be disposed between the protection protrusions 75. If the protection protrusions 75 are formed, the protection protrusions 75 may assist the current collecting tap 42 to be relatively stably coupled with the negative electrode terminal 22 by preventing collision of the case 26 and the current collecting tap 42 when an impact is transmitted from the outside, such that short-circuiting between the case 26 and the current collecting tap 42 may be prevented.

A fuse protrusion 73 that is configured to protrude into a fuse hole 42e may be formed on the cover plate 71 of the second cover 70. If the fuse protrusion 73 is formed, the fuse protrusion 73 acts as a support for separating the upper connection portion 42a from the lower connection portion 42d after the fuse portion 42c has melted. Without support for separation, if vibration or impact is transferred from the outside after the fuse portion 42c has melted, the upper connection portion 42a may be coupled again to the lower connection portion 42d, and an overcurrent might flow, which may cause the rechargeable battery 101 to ignite or explode. However, if the fuse protrusion 73 is inserted into the fuse hole 42e, the melted portion may be prevented from being coupled again.

A corner of the cover plate 71 that faces an inside of the case 26 on the second cover 70 and the side wall 72 may be rounded. When the external impact is transferred to the rechargeable battery 101, if the electrode assembly 10 is raised and collides with the second cover 70, the electrode assembly 10 may be torn, such that a short-circuit may occur. However, if a round portion is formed on the second cover 70, it is possible to prevent the electrode assembly 10 from being damaged due to a collision of the electrode assembly 10 and the second cover 70.

The first cover 60 and the second cover 70 may be formed of, for example, a polymer having electric insulating property, e.g., a polymer having elasticity, so that the first cover and the second cover will not, or substantially will not, react with the electrolytic solution.

The side wall 62 of the first cover 60 may be inserted into the inside of the side wall 72 of the second cover 70, such insertion couples together the second cover 70 and the first cover 60. However, the present invention is not limited thereto, and the sidewall 72 of the second cover 70 may be inserted into the inside of the side wall 62 of the first cover 60.

Figure 5:
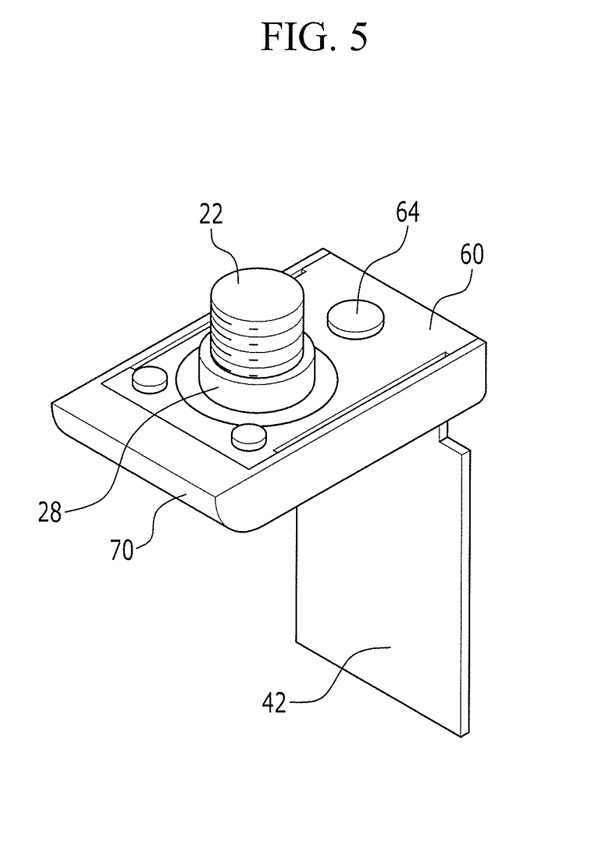
FIG. 5 is a perspective view that illustrates a state in which members illustrated in FIG. 3 and FIG. 4 are combined.

As shown in FIGS. 2 and 5, the second gasket 28, the terminal flange 22*a*, and the upper connection portion 42*a* of the current collecting tap 42 are between the second cover 70 and the first cover 60, such that, in a state in which the first cover 60 and the second cover 70 are assembled together, the first cover and the second cover form a modular element including the negative electrode terminal 22 and the current collecting tap 42.

When the negative electrode terminal 22 and the current collecting tap 42 are pre-assembled into a module, an assembly process of the rechargeable battery 101 may be relatively simplified by securing (e.g., fixing) the previously assembled negative electrode terminal 22 and current collecting tap 42 to the cap plate 31. Therefore, since the negative electrode terminal, the second gasket, and the current collecting tap may not be required to be separately installed on the cap plate, an installation process may be simplified and/or shortened. Further, since the second cover 70 surrounds the negative electrode terminal 22, the second gasket 28, and the current collecting tap 42, it is possible to prevent, or substantially prevent, a short-circuit from occurring due to, for example, the electrolytic solution infiltrating into the gap.

Figure 6:
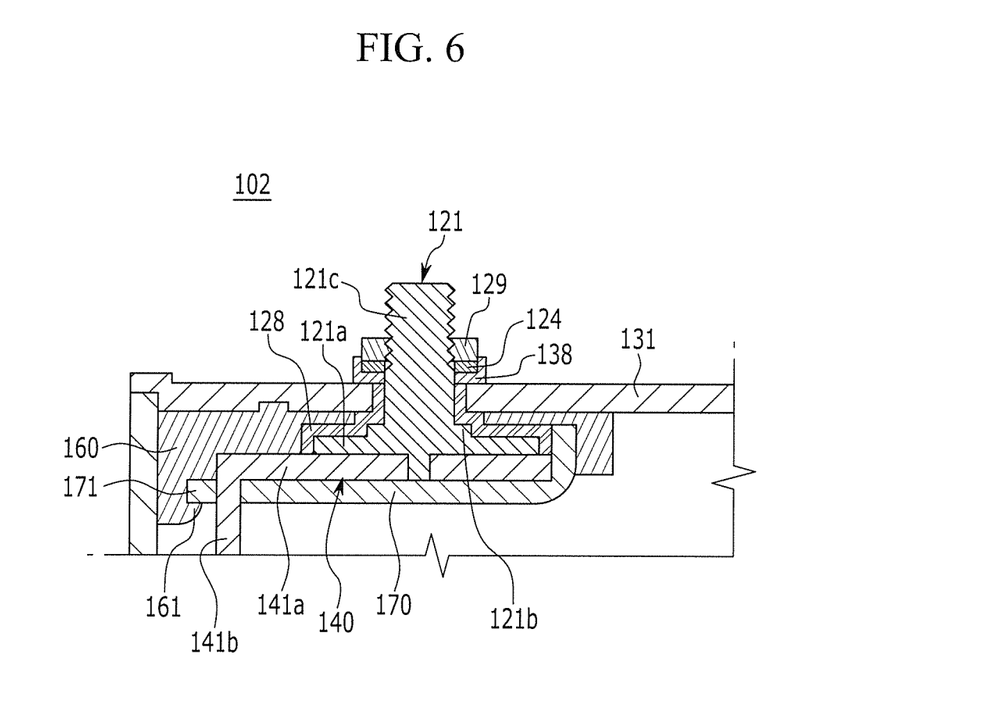
FIG. 6 is a cross-sectional view that illustrates a portion of a rechargeable battery according to a second exemplary embodiment of the present invention.

FIG. 6 is a cross-sectional view that illustrates a portion of a rechargeable battery according to a second exemplary embodiment of the present invention.

Referring to FIG. 6, since a rechargeable battery 102 according to the second exemplary embodiment may include the same (or substantially the same) structure as the rechargeable battery 101, according to the first exemplary embodiment, except for the structure of a first cover 160 and a second cover 170, descriptions of certain aspects of the rechargeable battery 102 are given by way of reference to the rechargeable battery 101 and will be omitted herein.

The first cover 160 and the second cover 170 may be coupled together by inserting the second cover 170 into the first cover 160. A sealant (e.g., a sealing material) (not shown) may be installed in a gap between the first cover 160 and the second cover 170 in order to prevent (or substantially prevent) intrusion of foreign materials.

A positive electrode terminal 121 may include a terminal flange 121*a* and a terminal pillar 121*c* protruding toward the upper portion of the case on the terminal flange 121*a*. The terminal flange 121*a* supports the terminal pillar 121*c* under a cap plate 131 by protruding in a side direction of the terminal pillar 121*c*. On the terminal flange 121*a*, a terminal protrusion (e.g., a protrusion spot) 121*b* protruding along a periphery (e.g., a circumference) of a lower end of the terminal pillar 121*c* may be formed.

In one embodiment of the present invention, a second gasket 128 into which the terminal flange 121*a* is inserted is installed on the upper portion of the terminal flange 121*a*, and a current collecting tap 141 that is electrically coupled to the positive electrode is installed on the lower portion of the terminal flange 121*a*. The current collecting tap 141 may include an upper connection portion 141*a* that is coupled, e.g., welded, to the terminal flange 121*a* and a lower connection portion 141*b* that continues downwardly at the upper connection portion 141*a* and is coupled, e.g., fixed, to the positive electrode uncoated region 111*a*.

The second gasket 128, the terminal flange 121*a*, and the upper connection portion 141*a* of the current collecting tap 141 may be installed by being inserted between the first cover 160 and the second cover 170, and the positive electrode terminal 121 and the current collecting tap 141 may be integrally secured, e.g., fixed.

Protection protrusions 171 that further protrude to an outside of the current collecting tap 141 may be formed at an edge in a width direction of the second cover 170, and the lower connection portion 141*b* may be disposed between the protection protrusions 171. A support spot 161 that supports the protection protrusion 171 at a lower portion thereof may be formed on the first cover 160. When the support spot 161 is formed, the first cover 160 and the second cover 170 may be stably coupled.

Similar to what was previously described in connection with rechargeable battery 101, the positive electrode terminal 121 and current collecting tap 141 may assembled into a module including the first cover 160 and the second cover 170, thereby aiding assembly.

While aspects of the present invention have been described in connection with certain exemplary embodiments, it is to be understood that the invention is not limited to the disclosed embodiments, but, instead, is intended to cover various modifications and equivalent arrangements included within the spirit and scope of the appended claims, and equivalents thereof.

| Description of Some of the Reference Numberals | |
|---|---|
| 101, 102: Rechargeable battery | |
| 10: Electrode assembly | |
| 11: Positive electrode | 11a: Positive electrode uncoated region |
| 12: Negative electrode | 12a: Negative electrode uncoated region |
| 13: Separator | 21: Positive electrode terminal |
| 22: Negative electrode terminal | 21a, 22a, 121a: Terminal flange |
| 22b, 121b: Terminal protrusion | 21c, 22c, 121c: Terminal pillar |
| 25: First gasket | 26: Case |
| 27: Electrolyte injection opening | 28, 128: Second gasket |
| 28a: Lower insulating portion | 28b: Step portion |
| 28c: Upper insulating portion | 28d: Groove |
| 29, 129: Nut | 30: Cap assembly |
| 31, 131: Cap plate | 38, 138: Sealing stopper |
| 39: Vent | 39a: Notch |
| 41, 42: Current collecting tap | 41a, 42a, 141a: Upper connection portion |
| 41b, 42d, 141b: Lower connection portion | |
| 42b: Fixing hole | 42c: Fuse portion |
| 42e: Fuse hole | 60, 160: First cover |
| 61, 71: Cover plate | 62, 72: Side wall |
| 63: Hole | 64: Support protrusion |
| 70, 80, 170: Second cover | 73: Fuse protrusion |
| 75, 171: Protection protrusion | 160: First cover |
| 161: Support spot | |

What is claimed is:

1. A rechargeable battery comprising:
    an electrode assembly comprising a first electrode and a second electrode;
    a case housing the electrode assembly;
    a cap plate coupled with the case;
    a terminal electrically coupled to the electrode assembly through a current collecting tap and protruding through the cap plate to an outside of the case;
    a first cover in which a lower portion of the terminal is located;
    a second cover in which an upper portion of the current collecting tap is located, the second cover being coupled with the first cover to secure the terminal and the current collecting tap; and
    a gasket, wherein:
        the terminal comprises a terminal flange and a terminal pillar protruding from the terminal flange to the outside of the case;

the gasket comprises a lower insulating portion in which the terminal flange is located and an upper insulating portion that surrounds the terminal pillar and protrudes upwardly;

the first cover has a hole;

a portion of the gasket is located in the first cover;

the upper insulating portion of the gasket protrudes through the hole;

the terminal further comprises a terminal protrusion protruding from the terminal flange along a periphery of the terminal pillar; and the gasket further comprises:
- a groove in which the terminal protrusion is disposed; and
- a step portion on an opposite side of the groove, the step portion protruding through the hole of the first cover and contacting a lower surface of the cap plate.

2. The rechargeable battery of claim 1, wherein:
the current collecting tap comprises a fuse portion having a smaller cross-section than its surroundings.

3. The rechargeable battery of claim 2, wherein:
at least one of the first cover or the second cover comprises a fuse protrusion protruding into the fuse portion.

4. The rechargeable battery of claim 1, wherein:
the second cover comprises protection protrusions protruding to an outside of the current collecting tap, the current collecting tap being located between the protection protrusions.

5. The rechargeable battery of claim 1, wherein:
the second cover surrounds the upper portion of the current collecting tap and sidewalls of the first cover.

6. The rechargeable battery of claim 1, wherein:
the first cover surrounds sidewalls of the second cover.

7. The rechargeable battery of claim 1, wherein:
a sealant is between the first cover and the second cover.

8. The rechargeable battery of claim 1, wherein:
the first cover comprises a protrusion inserted into a groove on the cap plate.

9. The rechargeable battery of claim 1, wherein:
the first cover is coupled with the second cover by being inserted thereinto.

* * * * *